US008036838B2

(12) United States Patent
Parkinson (10) Patent No.: US 8,036,838 B2
(45) Date of Patent: Oct. 11, 2011

(54) PUMPING INSTALLATION CONTROLLER

(75) Inventor: Craig Stephen Parkinson, Runaway Bay (AU)

(73) Assignee: Multitrode Pty Ltd, Queensland (AU)

( * ) Notice: Subject to any disclaimer, the term of this patent is extended or adjusted under 35 U.S.C. 154(b) by 308 days.

(21) Appl. No.: 12/233,494

(22) Filed: Sep. 18, 2008

(65) Prior Publication Data

US 2009/0082977 A1   Mar. 26, 2009

(51) Int. Cl.
*G01F 23/14* (2006.01)
*G01D 18/00* (2006.01)

(52) U.S. Cl. ............ 702/55; 702/104; 73/290 R; 73/299

(58) Field of Classification Search .............. 702/55, 702/104; 73/290 R, 299
See application file for complete search history.

(56) References Cited

U.S. PATENT DOCUMENTS

| | | | |
|---|---|---|---|
| 4,669,309 A | 6/1987 | Cornelius | |
| 4,705,456 A | 11/1987 | Gardeen | |
| 4,739,786 A | 4/1988 | Parkinson | |
| 5,190,442 A | 3/1993 | Jorritsma | |
| 5,695,092 A | 12/1997 | Schrandt | |
| 6,341,552 B1 | 1/2002 | Potter et al. | |
| 6,408,227 B1 | 6/2002 | Singhvi et al. | |
| 6,931,925 B2 | 8/2005 | Huemer | |
| 7,120,218 B2 | 10/2006 | Srinivasan | |
| 2003/0033871 A1* | 2/2003 | Carroll et al. ............. | 73/299 |
| 2003/0216879 A1 | 11/2003 | Hashemian | |
| 2008/0140353 A1 | 6/2008 | Koehl | |

FOREIGN PATENT DOCUMENTS

| | | |
|---|---|---|
| DE | 19741324 | 3/1999 |
| DE | 10242128 | 3/2004 |
| JP | 63121704 | 5/1988 |
| JP | 01086097 | 3/1989 |
| JP | 04019518 | 1/1992 |
| JP | 06010403 | 1/1994 |
| JP | 21014034 | 1/2001 |
| WO | WO2006/133511 | 12/2006 |

* cited by examiner

*Primary Examiner* — Sujoy K Kundu
(74) *Attorney, Agent, or Firm* — DeLio & Peterson, LLC; Thomas E. Ciesco (57) ABSTRACT

This invention relates to a controller for a pumping installation using a combined pressure sensor and fluid level sensor arrangement. The controller includes a processor responsive to measurements from the sensor arrangement, as well as memory for storing a set of instructions for execution by the processor to correlate initial measurements taken by the sensors. The instructions allows the controller to monitor a fluid level in a well with the combined arrangement to compile a history of respective measurements for both sensors, and, in the event of an unexpected discrepancy between the measurements, to automatically calibrate the sensor arrangement according to the history of respective measurements to re-establish a correlation between the sensors.

18 Claims, 6 Drawing Sheets

PUMPING INSTALLATION CONTROLLER

TECHNICAL FIELD

The present invention relates to a method for monitoring a fluid level in a pumping installation and a controller for a pumping installation.

BACKGROUND

Figure 1:
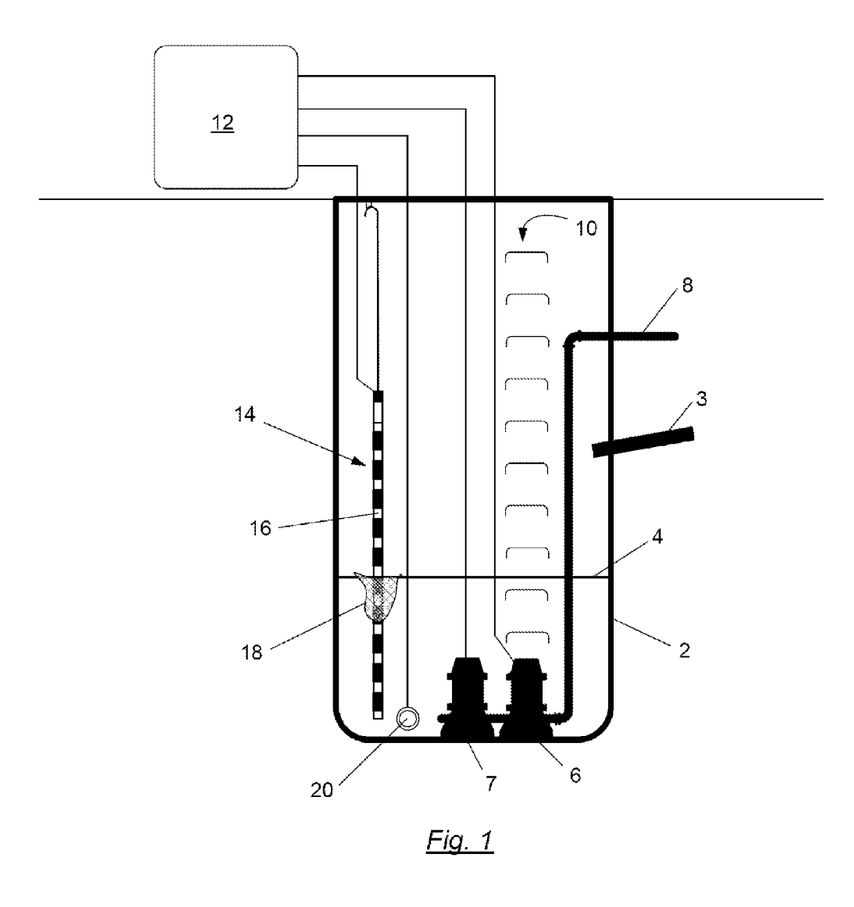
FIG. 1 is an example of a pumping installation utilising a controller 12 and sensors 14 and 20 to monitor and control a fluid level 4 inside a well 2.

FIG. 1 of the accompanying drawings depicts a well 2 containing water from an inlet 3. The water is shown filling the well to a level 4. Rungs 10 are provided within the well 2 in order to facilitate human service calls. In order to prevent overfilling of the well 2, lead and lag pumps 6 and 7 are provided to pump out water via an outlet 8. The lead and lag pumps 6 and 7 are operated by a controller 12 which monitors level 4 of the water.

One approach to monitoring the water level 4 in the past has been to make use of a probe 14 bearing multiple electrodes 16. As the water level rises, a low impedance, which controller 12 is able to monitor, occurs between the electrodes 16 on the probe 14 which are in contact with the water. Such a probe is described in U.S. Pat. No. 4,739,786 by the present inventor.

A problem identified by the current Inventor with water level sensing probe 14 when used in sewerage wells, is that the one or more electrodes may become covered with fat or other impurities 18. This is particularly the case about the duty or lead point of the well, i.e. the range that the level 4 assumes most of the time under normal conditions. Impurities 18 may cause shorting between electrodes 16 above or below the actual level of the water so that controller 12 is unable to accurately control lead and/or lag pumps 6 and 7 to maintain a desired fluid level. For example, if the lead pump 6 is activated before the correct level is reached, then the controller 12 will determine that the volume of water in the well has suddenly increased steeply and will use this incorrect figure to calculate pump down volume.

Similarly, if a very conductive liquid, such as salt water ingresses into the pit in beach side areas, premature activation of the pumps or alarms will occur. Alternately, if contaminates, such as oils, enter the pit, sensors become insulated and fail to detect the liquid level which can result in a total failure of the conductivity probe and subsequent flooding of the pit.

One approach to addressing the problem described above that has been attempted in the past is to install a pressure sensor 20 in order to provide controller 12 with an additional indication of water level. However, it is very difficult to physically and reliably install a separate pressure transducer 20 at an exact distance lower than the lowest electrode of the probe 14. This is particularly so because the pump cut-out level, where pressure sensors are usually intended to be installed as a backstop, can be over 10 meters below the well opening. Workplace health and safety regulations usually prohibit workers from climbing into pit 2, especially down to such a depth, to ensure that both probe 14 and pressure sensor 20 are at the correct level.

In any case, both the probe 14 and the pressure sensor 20 need to be removed for cleaning at regular intervals. The removal and reinstallation result in variations of the distance between the pressure sensor 20 and the bottom electrode and also of the calibration of the pressure sensor.

If installation of probe 12 and sensor 20 is attempted without entry into well 2 then it is virtually impossible to see and locate them accurately due to ongoing inflow into the well and associated spray.

Sewerage wells should be completely pumped out from time to time in order to avoid the build-up of excessive fat in the well. If the pumps are not turned off once the low water level is reached then the pumps may pump dry. However, variations in sensitivity of the pressure sensor may prevent the controller from accurately detecting the low water level cut out point. This results in either dry pumping, if the level is determined to be higher than it actually is, or less than optimal pumping out if the level is determined to be lower than it actually is.

To provide reliable fluid level calibration, the exact distance from the pressure transducer module 20 to each electrode must be known and needs to remain exactly the same throughout the life of the probe 14. If this distance changes, perhaps due to stretching and movements of the probe 14, then all calibration rules and formulas have to be updated resulting in much work and inaccuracies.

International patent application PCT/AU2006/000844 (WIPO publication No. WO2006/133511), to the present applicant, describes electrode fluid level sensing probe that terminates with a pressure sensor. Such a probe overcomes the problem of accurately locating the pressure sensor at a predetermined distance from the lowermost electrode. However, to date pump controllers have not been devised to properly take advantage of this new type of water level sensing probe.

It is an object of the present invention to provide a method and associated pump controller which offer improvements over those hitherto known in the art and which can process data from a probe of the type described in WO2006/133511.

SUMMARY OF THE INVENTION

According to one aspect of the present invention, there is provided a method for monitoring a fluid level in a pumping installation using a combined pressure sensor and fluid level sensor arrangement, which method includes the steps of:
  correlating initial measurements taken by the sensors;
  monitoring a fluid level in a well with the combined arrangement to compile a history of respective measurements for both sensors; and
  in the event of an unexpected discrepancy between the measurements, automatically calibrating the sensor arrangement according to the history of respective measurements to re-establish a correlation between the sensors.

The method may include the step of registering the combined sensor arrangement. The step of registering may include establishing an expected correlation between the sensor measurements based on the type or model of sensor arrangement registered. The type of sensor arrangement may be defined according to its physical attributes, such as length, position of the pressure sensor in relation to the fluid level sensor, a configuration of the fluid level sensor, a configuration of the pressure sensor, and/or the like.

Accordingly, the step of registering may include establishing an expected correlation for a fluid level sensor having a plurality of electrodes arranged along a shaft. Similarly, the step of registering may include establishing an expected correlation for a pressure sensor located on an end of the shaft.

It is to be appreciated that the fluid level sensor may include a plurality of electrodes which detect a fluid level according to a conductive path established between such electrodes when they are submerged in a conductive fluid. Otherwise, the fluid level sensor may include a plurality of electrodes which sense a fluid level when a conductive path is established between the respective electrode and ground through a conductive fluid when submerged in such a conductive fluid.

The step of correlating the initial measurements may include linking the measurements so that a quantified change in one sensor's measurement allows prediction of expected change in the other sensor's measurement.

The step of calibrating may include performing a diagnostic check on a sensor. The diagnostic check may include an impedance check between electrodes submerged in a fluid. The diagnostic check may include an impedance check between an electrode and ground through a fluid. The diagnostic check may include comparing the pressure sensor measurement to a reference value. The reference value may include a measurement taken by a reference pressure sensor.

The step of calibrating may include statistically analysing the history of the fluid level sensor in order to calibrate the pressure sensor. The step of calibrating may include statistically analysing the history of the pressure sensor in order to calibrate the fluid level sensor. The statistical analysis may include determining a variance in measurements of the sensor to isolate the unexpected discrepancy. As such, by isolating the unexpected discrepancy, the sensor responsible therefor may be detected and marked for maintenance.

The step of calibrating may include activating a vibrator for removing undesired matter from the sensor arrangement.

The method may include the further step of controlling pumping means according to the monitored fluid level to maintain the fluid level in the well within a desired range.

The method may include a step of raising an alarm in the event that the step of calibrating fails to ameliorate the measurement discrepancy of the sensors.

According to a further aspect of the invention, there is provided a controller for a pumping installation using a combined pressure sensor and fluid level sensor arrangement, the controller including:

a processor responsive to measurements from the sensor arrangement; and memory for storing a set of instructions for execution by the processor to correlate initial measurements taken by the sensors, to monitor a fluid level with the combined arrangement to compile a history of respective measurements for both sensors, and, in the event of an unexpected discrepancy between the measurements, to automatically calibrate the sensor arrangement according to the history of respective measurements to re-establish a correlation between the sensors.

The controller may include fluid level and pressure sensor inputs for receiving the measurements from the sensor arrangement.

The processor may be responsive to measurements from a sensor arrangement including a fluid level sensor having a plurality of electrodes arranged along a shaft with the pressure sensor located on an end of the shaft. It is to be appreciated that the fluid level sensor may include a plurality of electrodes which detect a fluid level according to a conductive path established between such electrodes when they are submerged in a conductive fluid. Otherwise, the fluid level sensor may include a plurality of electrodes which sense a fluid level when a conductive path is established between the respective electrode and ground through a conductive fluid when submerged in such a conductive fluid.

The memory may include instructions for the processor to register the fluid level and pressure sensors as a combined arrangement. The memory may include instructions for the processor to register the sensor arrangement by establishing an expected correlation between the sensor measurements based on the type or model of arrangement registered. The processor may determine the type or model of sensor arrangement by reading an identifier from a sensor.

Accordingly, the memory may include a lookup table for a number of sensor arrangements according to unique identifiers. The look-up table may define the sensor arrangement according to its physical attributes, such as length, position of the pressure sensor in relation to the fluid level sensor, a configuration of the fluid level sensor, a configuration of the pressure sensor, and/or the like.

The memory may include instructions for the processor to correlate the initial measurements by linking the measurements so that a quantified change in one sensor's measurement allows prediction of an expected change in the other sensor's measurement.

The memory may include instructions for the processor to perform the calibrating by performing a diagnostic check on a sensor. The diagnostic check may include an impedance check between electrodes submerged in a fluid. The diagnostic check may include an impedance check between an electrode and ground through a fluid.

The memory may include instructions for the processor to perform the calibrating by statistically analysing the history of the fluid level sensor in order to calibrate the pressure sensor. The memory may include instructions for the processor to perform the calibrating by statistically analysing the history of the pressure sensor in order to calibrate the fluid level sensor. The memory may include instructions for the processor to perform the calibrating by determining a variance in measurements of the sensor to isolate the unexpected discrepancy. As such, by isolating the unexpected discrepancy, the sensor responsible therefor may be detected and marked for maintenance.

The memory may include instructions for the processor to perform the calibrating by activating a vibrator for removing undesired matter from the sensor arrangement.

The controller may include a reference pressure sensor. The memory may include instructions for the processor to calibrate the pressure sensor and/or fluid level sensor according to a measurement taken by the reference pressure sensor.

The controller may include a user interface for allowing a user to specify operational parameters of the controller. The memory may store instructions to enable the processor to interface with a user interface to allow a user to specify operational parameters of the controller. The type of sensor arrangement may be specified via the user interface.

The user interface may include any suitable means allowing a user to specify, alter and/or programme the operational parameters of the controller. The operational parameters may include lookup tables, sensor arrangement types, expected correlations between sensor measurements, calibration data, desired fluid levels, such as desired fluid level in the well, and/or the like. As such, the user interface may include a touch screen display, a keypad, discrete buttons, a data connection port, and/or the like.

The processor may further be configured to control pumping means according to the monitored fluid level to maintain the fluid level within a desired range.

The processor may be configured to raise an alarm in the event that the calibrating fails to ameliorate the measurement discrepancy of the sensors.

According to a further aspect of the present invention, there is provided a media, such as a magnetic or optical disk or solid state memory, containing computer readable instructions for execution by a processor to thereby perform the preceding method.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

It is to be appreciated that reference in this description to "an embodiment" or "one embodiment" of the invention does not exclude certain features of the invention from other embodiments thereof. Similarly, different features of the invention may be present in different embodiments thereof without subtracting from the applicability of such features to other embodiments of the invention.

Figure 2:
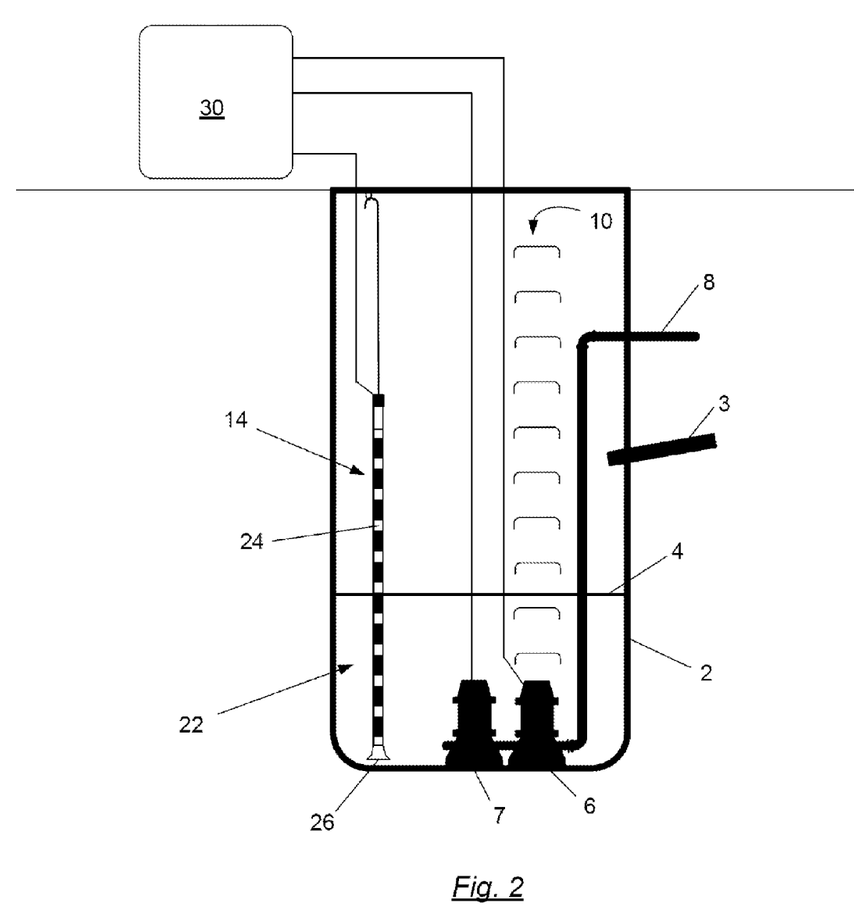
FIG. 2 is an example of pumping installation controller, in accordance with the invention, in use.

Referring now to FIG. 2, there is depicted a pumping station well 2 that includes a probe 22 having a shaft along which a plurality of electrodes 24 are located and terminating at its lower end in a pressure sensor 26.

The well 2 is typically fed by a sewage inlet 3 to reach a fluid level 4. The fluid level 4 can be varied by operation of lead and lag pumps 6 and 7 under control of controller 30. The well also includes rungs 10 to allow service entry.

Figure 3:
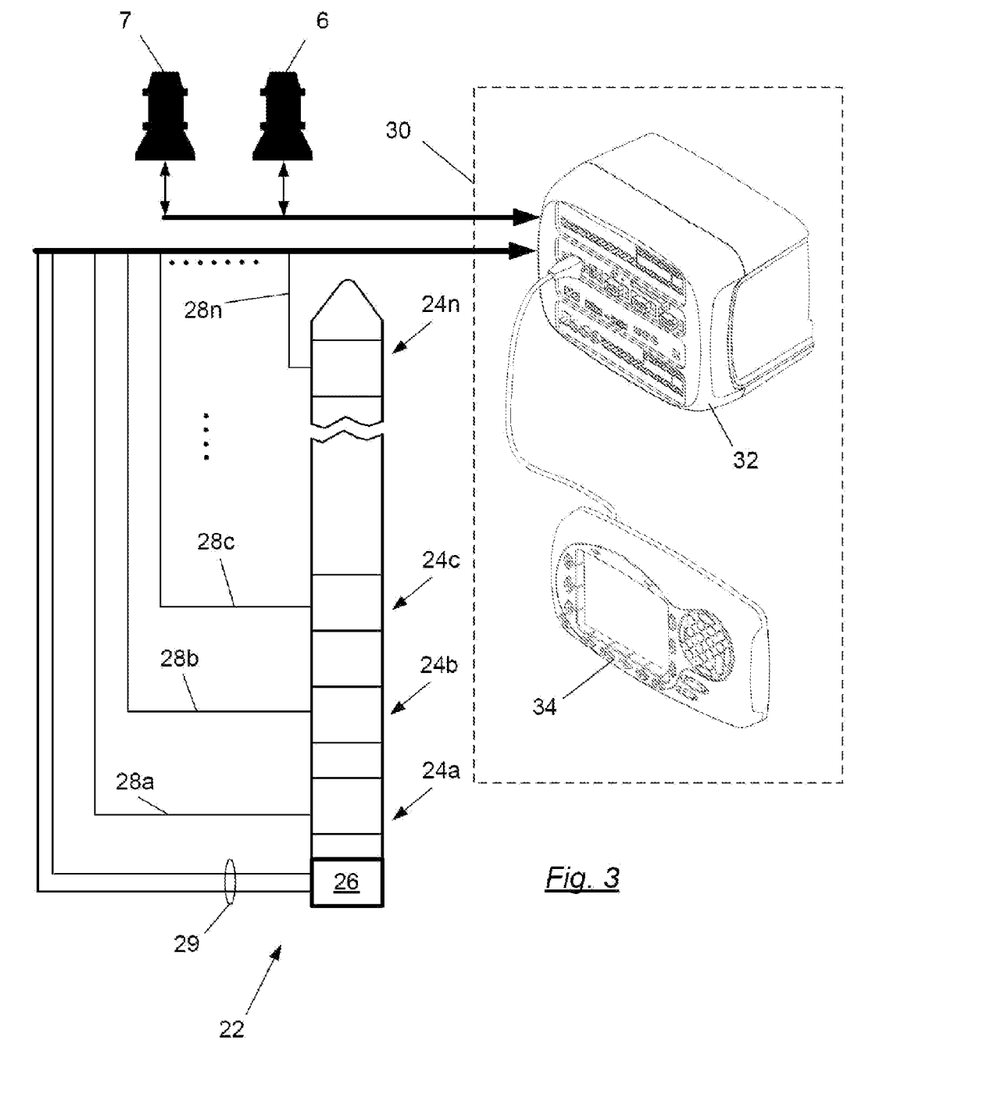
FIG. 3 shows one embodiment of the connection between the controller 30 and the fluid level sensor 24, pressure sensor 26, and pumps 6 and 7.

A more stylized depiction of the probe is shown in FIG. 3, wherein it can be seen that each of the electrodes 24a, ..., 24n is connected by a corresponding wire 28a, ..., 28n to the controller 30. In a preferred embodiment, the controller 30 is provided in two parts. The first part is provided in the form of a base station 32, which receives wires 28a, ..., 28n, and 29 from probe or sensor arrangement 22, and which is also coupled to pumps 6 and 7.

It is to be appreciated that, in one embodiment, the probe 14 detects a fluid level in the well according to a conductive path established between the electrodes 24 when they are submerged in the fluid. Otherwise, the probe 14 may sense a fluid level when a conductive path is established between each electrode 24 to ground when submerged in the fluid.

The second part of the controller is provided in the form of a user interface module 34 that includes a display screen and various keys for displaying information to an operator and receiving manually entered operator commands. In one embodiment, the first and second parts 32 and 34 are interconnected by a cable so that the interface module 34 may be located at a considerable distance from the base station 32.

Figure 4:
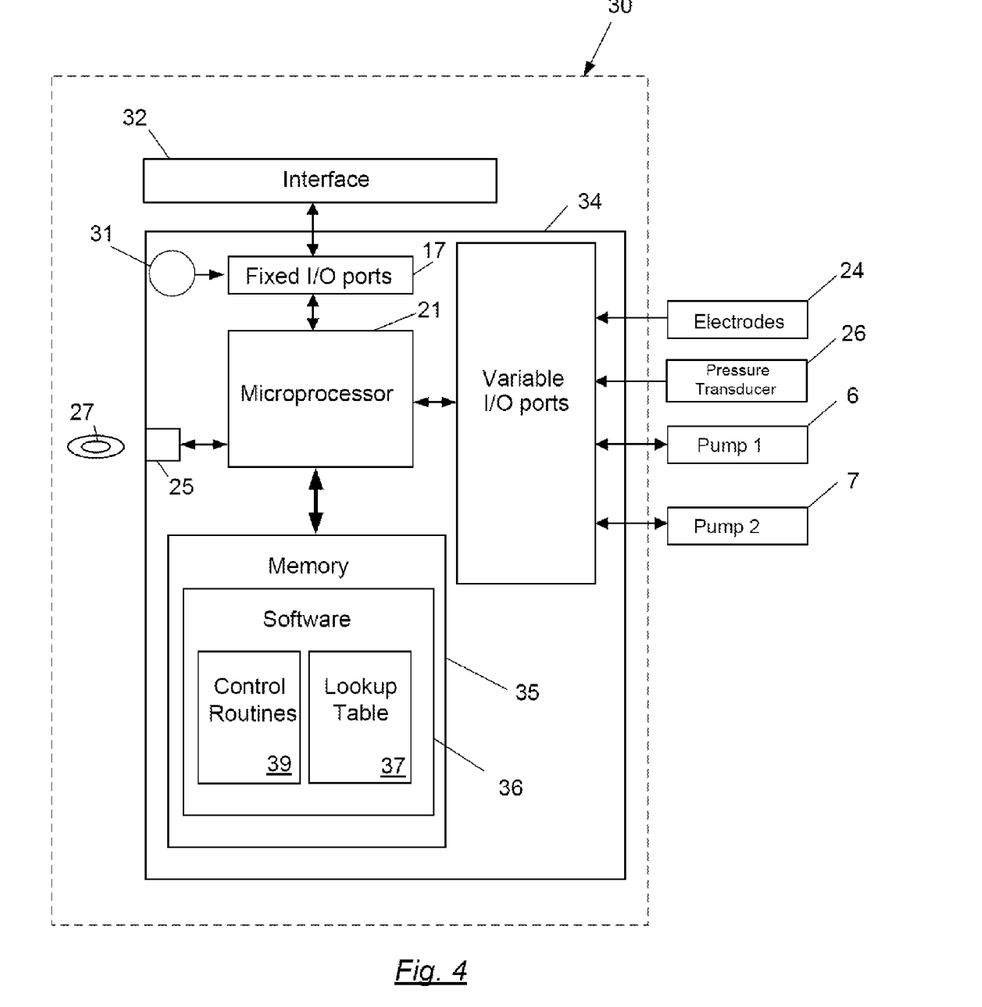
FIG. 4 is a functional block diagram of one embodiment of the components comprising the controller 30.

FIG. 4 depicts an embodiment of the pump controller 30 in more detail. The user interface 32 is fixedly wired to fixed input/output (I/O) ports 17 of the controller 34 which, in turn, are interfaced using suitable circuitry to a microprocessor 21 that accesses memory 35. In other embodiments of the invention, the shown connections may be established wirelessly, e.g. via radio frequency, or the like. Memory 35 stores a software product 36 including instructions for the microprocessor 21 to monitor and receive measurements from electrodes 24 and pressure transducer 26. The software 36 further includes instructions to monitor and operate pumps 6 and 7 and prompt for and receive operator input via user interface 32.

In one embodiment of the invention, the user interface 32 includes a touch screen display, as shown. However, in other embodiments, the user interface 32 may include any suitable means allowing a user to specify, alter and/or programme the operational parameters of the controller 30, for example a screen flanked by buttons, or the like. The operational parameters may include lookup tables, sensor arrangement types, expected correlations between sensor measurements, calibration data, desired fluid levels, and/or the like.

Software product 36 is typically provided as firmware in an integrated circuit memory device or as a magnetic or optical disc 27 which microprocessor 21 can access by means of disc drive 25, or the like.

Figure 5:
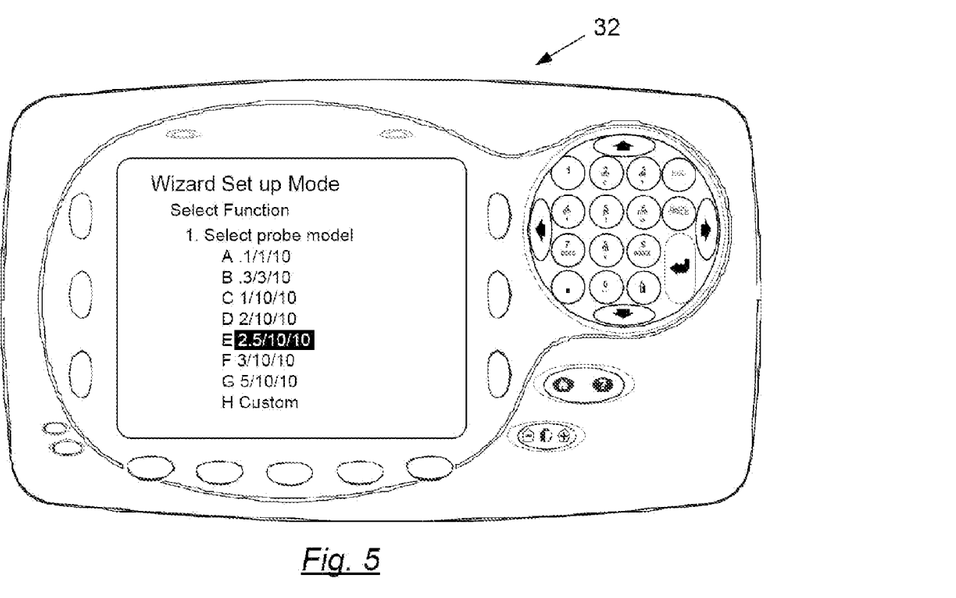
FIG. 5 is an example of a user interface of the controller 30 during manual registration of the sensor arrangement.

Initially, in one embodiment, the software 36 causes interface 32 to prompt a user to enter information identifying the particular probe 22 that is in use. A typical data prompt and capture screen is shown in FIG. 5 wherein a user has selected probe model "E" from the selection menu. This allows the controller 30 to register the combined pressure sensor and a fluid level sensor arrangement 22.

By registering the type of sensor arrangement 22 in use, microprocessor 21 is able to determine the position of the bottom pressure sensor 26 relative to electrodes 24a, ..., 24n by referring to lookup table 37. Lookup table 37 contains position data for each of the common models of probe that are available. In the event that the model of the probe in question is not listed in the lookup table, the operator can select a "custom" option from the selection menu and then manually enter the position details.

In a further embodiment of the invention, the controller includes instructions for the processor 21 to interpret an electronic chip located in the probe 22 and stores a model identifier. The identifier may be in the form of a model number or similar code able to uniquely identify the probe type to the processor 21. In such an embodiment, the processor 21 is able to read the probe 22 for its model type, or the like. This would obviate the requirement for the operator or user to specify the details of the probe or sensor arrangement 22 manually. The probe types are generally stored in the lookup table 37.

Figure 6:
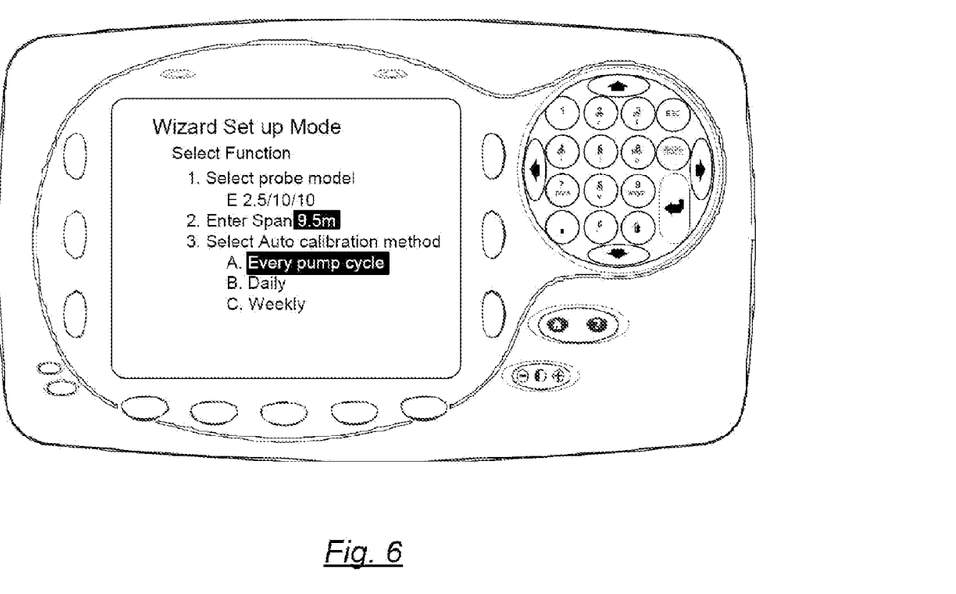
FIG. 6 is an example of the user interface of the controller 30 showing further operational parameters being entered.

Once the relative positions of the pressure sensor 26 and electrodes 24 have been determined, the software causes microprocessor 21 to operate the interface 32 in order that it prompts the operator to enter the span of the well in question. The span is the difference between the expected high and low water levels that the pressure transducer 26 is likely to encounter. For example, as shown in FIG. 6, the operator may select a span of 9.5 meters.

Subsequent to capturing the span of the well, the software 36 then causes microprocessor 21 to operate interface 32 in order to prompt for a user to input a calibration cycle. For example, as shown in FIG. 6, the operator may select between automatic calibration should a discrepancy be detected, calibrating the sensor arrangement every pump cycle, daily, weekly, or the like.

Once the sensor arrangement 22 has been registered by the processor 21, the controller 30 is able to correlate initial measurements taken by the sensors 24 and 26. The registration setup of the probe 22 generally establishes an expected correlation between the sensor measurements based on the type of sensor arrangement registered.

For example, the type of probe or sensor arrangement 22 may be defined according to its physical attributes, such as length of the probe, position of the pressure sensor in relation to the electrodes of the fluid level sensor, a configuration of the fluid level sensor such as number of electrodes on the shaft, signal outputs of the respective sensors, and/or the like. One probe may have ten electrodes spaced a predetermined distance apart, and another may have eight electrodes, or the like.

As such, the correlation is typically the relationship between the measurements received by the fluid level sensor 24 and the pressure transducer 26. For example, in one embodiment, a known probe type registered by the controller 30, as described above, includes two known sensors 24 and 26. The initial measurements from both sensors are taken and correlated by the processor 21 so that a quantified change in one sensor's measurement allows prediction of expected change in the other sensor's measurement. This is possible by the controller 30 having a lookup table 37 with known characteristics for the different types of sensors 24 and 26.

For example, if the pressure sensor's output increases by, say, 10 mA, then the software product 36 enables the processor 21 to calculate that the fluid level sensor's output should indicate a change in impedance between electrodes 24a and 24b, or the like. In this manner, by establishing the relationship between the sensor measurements, the processor 21 can monitor the functioning of the sensors according to the expected output of each other.

It is also to be appreciated that the pressure sensor 26 does not require atmospheric compensation means, such as a tube to the atmosphere, or the like. This is due to the fact that the pressure sensor 26 need not sense the pressure of the fluid to an accurate degree with reference to the atmosphere. Rather, the measurements of the pressure sensor 26, irrespective of the accuracy relative to atmospheric pressure, are tied to the output of the fluid level sensor during correlation.

In one embodiment of the invention, the controller 34 includes a reference pressure sensor 31, as shown in FIG. 4. The reference pressure sensor 31 may be used by the controller 34 to calibrate the pressure sensor 26, as the controller 31 is typically at an atmospheric pressure. This further obviates the requirement for a tube to the atmosphere. Accordingly, calibration of the fluid level sensor 22 and/or the pressure sensor 26 may be done according to a measurement by the reference pressure sensor 31.

In general, the correlation of the pressure sensor 26 measurements to the fluid level sensor 22 measurements provides a convenient calibration and error-checking means. It also nullifies the effect of the fluid's densities, temperature, etc. on the measurements of the pressure sensor 26.

Therefore, in the instance that the measurements of the sensors do not concur, the processor 21 is able to monitor the outputs of the sensors 24 and 26 to determine which sensor's output deviates the most from the expected historical value. For example, the pressure sensor or transducer 26 can provide an expected measurement for the judged fluid level in the well, when the fluid level sensor suddenly measures a different value than expected. As the pressure sensor indicates the expected measurement, the unexpected output of the fluid sensor can be correlated to the measurement of the pressure sensor judged to be correct.

In another embodiment of the invention, the controller 30 may correlate the measurements of the sensors when the fluid level is at a level which provides historically correct measurements. For example, if the fluid level in the well is maintained at a substantially constant level for a period of time, impurities will accumulate on the probe 22 at that level. However, if the pumps lower the fluid to a level below or above such a constant level, the impact of the impurities on the sensor measurements will be reduced. When the fluid level is at such a historically uncommon level, the processor 21 is able to use the measurements due to an uncommon fluid level to recalibrate the correlation between sensor measurements so that more accurate monitoring of the fluid level is possible.

For example, if the fluid level is kept at a depth of 3 meters over a period of time, fat will build up on the probe 14 where it enters the fluid. The electrodes immersed in the fluid will have lower impedance between them, while the electrodes above the fluid will have a higher impedance or open circuit value. Should the fluid level be decreased to 2.5 meters, the fat build-up at the 3 meter level may continue to provide a lower impedance value across the electrodes at the higher level, i.e. the electrodes are "short-circuited" by the fat to a degree, even though the fluid level is actually lower. The situation could arise where the fluid level sensor indicates conflicting fluid levels at 2.5 and 3 meter levels.

According to the invention, the controller 30 is aware that the historical fluid level was at 3 meters. In addition, the pressure sensor 26 will also indicate a drop in fluid level of approximately 0.5 meter. The processor 21 is then able to determine that the 3 meter measurement of the fluid level sensor 24 is inaccurate, and flag it as such for that particular level.

In use, the controller 30 monitors the fluid level with the combined sensor arrangement and logs these measurements to compile a history for the sensors. The controller 30 is able to control the pumps 6 and 7 to keep the fluid level at a desired range, typically as specified by an operator via the user interface 32. The controller 30 monitors the measurements from the respective sensors and compiles a history of these measurements for both sensors.

In the event of a discrepancy between the measurements, the controller 30 automatically calibrates the sensor arrangement according to the history of measurements. The controller 30 may also perform statistical analysis on the measurements to determine which sensor is inaccurate when compared to the history of the other sensor.

For example, the fluid level is measured as 2.5 meters by both sensors 22 and 26 when the controller 30 activates the pumps 6 and 7 to lower the fluid level according to operational parameters. The pressure sensor 26 measures that the fluid level is dropping whilst the pumps are active, but the fluid level sensor 22 measures a discrepancy in that the fluid level is level at 2.5 meters and at 1 meter. This is a clear indication that there are impurities present at the 2.5 meter level on the fluid level sensor, said impurities shorting the electrodes at that level.

The controller 30 is then able to detect that the fluid level sensor 22 is incorrect for readings at that level. For future readings, the controller 30 may then disregard the output for the fluid level sensor 22 at the 2.5 meter mark. The controller 30 may then also raise an alarm that the fluid level sensor 22 requires maintenance.

In one embodiment, the calibrating or calibration procedure includes performing a diagnostic check on the sensors to determine if they are operating within optimal ranges. For example, if a sensor's output typically varies between 10 mA and 20 mA, and the output suddenly and unexpectedly drops to, say, 5 mA, the controller can determine that something is wrong with that particular sensor. Similarly, the processor 21 can perform an impedance check between electrodes of the fluid level sensor 24 to check that it is working properly, or from an electrode to ground.

The processor 21 may also compile a statistical measurement of the fluid level sensor 24 in order to calibrate the pressure sensor 26. For example, as the sensor measurements have been correlated during the initial setup procedure, the processor 21 is able to keep a history of measurements for the sensors 24 and 26. As the build-up of impurities, such as fat 18, on the probe generally occurs over time, the processor 21 is able to adjust the relationship in measurements between sensors accordingly.

As such, a gradual decrease in impedance between electrodes for the fluid level sensor 24 would be indicative of fat build-up on the probe 14, which build-up does not affect the pressure sensor in the same manner. By continually correlating the sensor measurements, the controller can maintain substantially accurate measurements from the probe 14. Similarly, a gradual increase in impedance may be indicative of build-up of non-conductive impurities. This continual adjustment is possible between both sensors as the controller re-establishes the correlation.

For example, in one embodiment, the controller knows that when the output of the pressure transducer increases by 10 mA, the fluid level sensor 22 provides an impedance of 15 kilo Ohm between the electrodes. Fat build-up over time might gradually reduce the impedance between the electrodes, so that an output of the pressure transducer of 10 mA produces an impedance measurement of 4.5 kilo Ohm over time. The controller 30 is configured to take into account such gradual alterations of the sensors due to the build-up of impurities.

In one embodiment of the invention, the controller 34 is configured to receive a desired fluid level from a user via the interface 32. The software product 36 contains instructions for the processor 21 to favour the pressure sensor measurement over a predetermined range of such a desired fluid level, as it is known that the fluid level sensor's measurements may be unreliable about this point due to the build-up of impurities over time.

For example, if the desired fluid level or duty/lead point is set at 3 meters at which the controller 34 should maintain the fluid level, then it follows that impurities are likely to accumulate at such a level on the probe 14. As discussed, these impurities may reduce the accuracy of measurements of the fluid level sensor over time. The controller 34 is configured to favour the pressure sensor's measurements when the fluid level is sensed to fall in this range, as the pressure sensor is not affected by the build-up of impurities. The controller 34 may then favour the measurements of the pressure sensor 26 when calibration at this level is taking place.

In a further embodiment of the invention, the calibration procedure includes activating a vibrator for removing undesired matter from the probe or sensor arrangement 22. The vibrator may include an ultrasonic vibrator tuned according to a length of the sensor arrangement, or the like. In this manner, activating the vibrator will cause the probe to oscillate and shake some of the impurities from the probe 22.

The controller 30 is also typically configured to raise an alarm in the event that the calibration procedure fails to ameliorate the measurement discrepancy of the sensors. For example, the alarm may include notifying a suitable party that the probe 22 is malfunctioning, so that the probe can be cleaned, or the like.

As such, the controller 30 typically includes alarm means, such as a transmitter for transmitting an alarm signal, or the like. The user interface 32 may also include an alarm, such as an audio signal, a visual indication, or the like, to notify an operator.

It is also to be appreciated that the pressure sensor is able to monitor the entire span of the well, i.e. from the bottom to a level above the probe 14 where the fluid level sensor 24 is unable to measure. As such, this allows the controller 30 to monitor for emergency fluid levels via the pressure sensor 26, or the like. The controller 30 is thus able to raise an alarm for very high fluid levels, or calculate a time until the well overflows, or the like.

Figure 7:
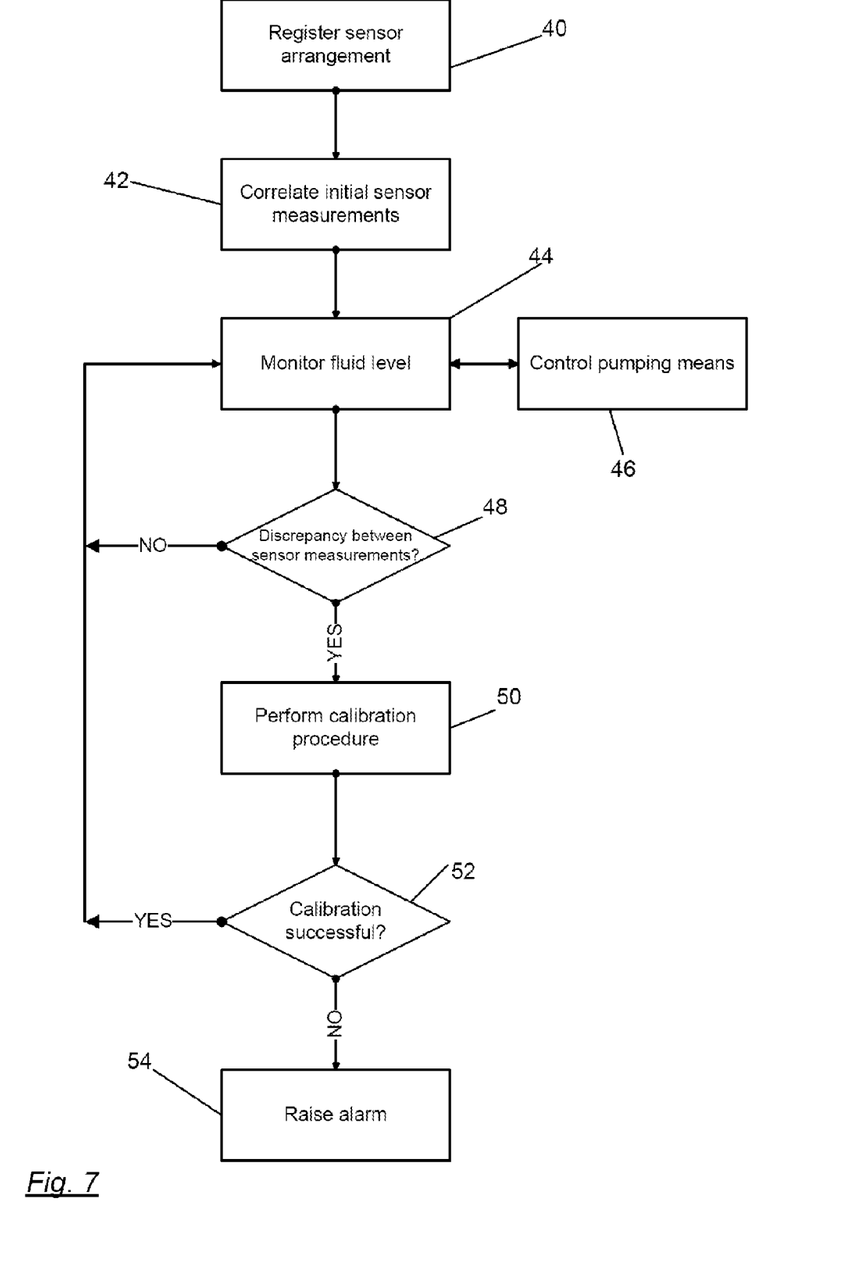
FIG. 7 is an operational flow diagram showing the steps of a method for controlling the pumping installation, in accordance with the invention.

With reference to FIG. 7 of the drawings, the invention also comprises a method for controlling the pumping installation, as described above. The typical method steps are outlined in the flow diagram of FIG. 7. At box 40, the sensor arrangement is registered. As described above, this registration includes identifying the probe or sensor arrangement, albeit automatically or manually. This registration enables the controller 30 to retrieve the correct parameters from the look-up table corresponding to the selected probe.

At box 42 the initial sensor measurements are correlated. By establishing the relationship between the sensors, the controller 30 is able to detect and subtle changes in measurements over time, allowing automatic calibration even in the event of fat build-up on the probe 22.

At box 44, the fluid level 44 is monitored according to a preset value, typically provided by an operator. As such, the controller 30 controls the pumps 6 and 7 at box 46 in order to keep the fluid level within acceptable limits.

During the monitoring of the fluid level at box 44, should an unexpected discrepancy between the fluid level sensor and pressure sensor measurements be detected, the controller 30 will perform the calibration procedure. This decision step is indicated by block 48 in the flow diagram. However, if the measurements correlate as expected, the controller will keep on monitoring the fluid level and controlling the pumps accordingly as shown at boxes 44 and 46.

The calibration procedure shown at box 50 can include different actions which the controller 30 can perform in order to try and calibrate the sensors. The actions may include activating a vibrator, performing a diagnostic check on the components, consulting statistical values compiled over time for the sensors to determine the most likely accurate measurement, and/or the like.

If the measurements of the sensors are able to be re-confirmed, the controller resumes with normal operation of monitoring and controlling the fluid level, as shown in blocks 44 and 46.

However, should the calibration appear to have failed and the measurements remain unreconciled, the controller 30 will trigger an alarm, as shown at box 54. This alarm will notify the relevant party that the probe is malfunctioning and must be serviced.

The Inventor associates several advantages to the method and associated controller. The Inventor regards it as an advantage that the controller is able to perform automatic calibration of the sensor arrangement according to the measurements from the respective sensors.

The Inventor regards it as a further advantage that the controller provides for an elegant solution which is easy to install and commission, as well as to maintain and service. The Inventor regards it as an additional advantage that the controller is able to combine the accuracy of a fluid level sensor with the anti-fouling qualities of a pressure sensor to achieve accurate monitoring of a fluid level.

The Inventor regards it as a yet further advantage that controller is able to correlate sensor measurements to enable calibration of the sensor arrangement, thereby reducing maintenance on the probe.

The invention has been described in language more or less specific to structural or methodical features. It is to be understood that the invention is not limited to specific features shown or described, since the means herein described comprises examples of preferred forms of putting the invention into effect. The invention is, therefore, claimed in any of its forms or modifications within the proper scope of the appended claims appropriately interpreted by those skilled in the art. As such, a person skilled in the art will appreciate that many embodiments and variations can be made without departing from the ambit of the present invention.

I claim:

1. A controller for a pumping installation using a combined pressure sensor and fluid level sensor arrangement, the arrangement comprising a pressure sensor and a fluid level sensor having electrodes, the controller comprising:
   a processor responsive to measurements from the sensor arrangement; and
   memory for storing a set of instructions for execution by the processor to correlate initial measurements taken by the sensors, to monitor a fluid level in a well with the combined arrangement to compile a history of respective measurements for both sensors, and, in the event of an unexpected discrepancy between the measurements, to automatically calibrate the sensor arrangement according to the history of respective measurements to re-establish a correlation between the sensors;
   wherein the memory includes instructions for the processor to perform the calibrating by statistically analyzing the history of the pressure sensor in order to calibrate the fluid level sensor.

2. A controller as claimed in claim 1, wherein the processor is configured to determine a type or model of sensor arrangement by reading an identifier from the sensor arrangement.

3. A controller as claimed in claim 2, wherein the memory includes a lookup table with identifiers for a number of sensor arrangements, said look-up table defining the sensor arrangement according to at least one physical attribute selected from a group consisting of length, position of the pressure sensor in relation to the fluid level sensor, a configuration of the fluid level sensor, and a configuration of the pressure sensor.

4. A controller as claimed in claim 2, wherein the memory includes instructions for the processor to register the sensor arrangement by establishing an expected correlation between respective fluid level and pressure sensor measurements based on the type or model of arrangement determined.

5. A controller as claimed in claim 1, wherein the memory includes instructions for the processor to correlate the initial measurements by linking the measurements so that a quantified change in one sensor's measurement allows prediction of an expected change in the other sensor's measurement.

6. A controller as claimed in claim 1, wherein the memory includes instructions for the processor to perform the calibrating by performing a diagnostic check on a sensor, the diagnostic check including an impedance check between the electrodes of the sensor arrangement.

7. A controller as claimed in claim 1, wherein the memory include instructions for the processor to perform the calibrating by statistically analyzing the history of the fluid level sensor in order to calibrate the pressure sensor.

8. A controller as claimed in claim 1, wherein the memory includes instructions for the processor to perform the calibrating by determining a variance in measurements of the respective sensor to isolate the unexpected discrepancy.

9. A controller as claimed in claim 1; wherein the memory includes instructions for the processor to perform the calibrating by activating a vibrator for removing undesired matter from the sensor arrangement.

10. A controller as claimed in claim 1, wherein the processor is configured to control pumping means according to the monitored fluid level to maintain the fluid level in the well within a desired range.

11. A method for monitoring a fluid level in a pumping installation using a combined pressure sensor and fluid level sensor arrangement, the arrangement comprising a pressure sensor and a fluid level sensor having electrodes, the method including the steps of:
   correlating initial measurements taken by the sensors;
   monitoring a fluid level in a well with the combined arrangement to compile a history of respective measurements for both sensors; and
   in the event of an unexpected discrepancy between the measurements, automatically calibrating the sensor arrangement according to the history of respective measurements to re-establish a correlation between the sensors;
   wherein the history is placed in a processor memory, the processor including instructions to perform the calibrating by statistically analyzing the history of the pressure sensor in order to calibrate the fluid level sensor.

12. A method as claimed in claim 11, which includes an initial step of registering the combined sensor arrangement by establishing an expected correlation between the sensor measurements based on the type or model of sensor arrangement registered as defined according to physical attributes of the sensor arrangement selected from a group consisting of length, position of the pressure sensor in relation to the fluid level sensor, a configuration of the fluid level sensor, and a configuration of the pressure sensor.

13. A method as claimed in claim 11, wherein the step of correlating the initial measurements includes linking the measurements so that a quantified change in one sensor's measurement allows prediction of expected change in the other sensor's measurement.

14. A method as claimed in claim 11, wherein the step of calibrating includes performing a diagnostic check on a sensor, said diagnostic check selected from a group consisting of an impedance check between the electrodes submerged in a fluid, an impedance check between an electrode and ground through a fluid, and comparing the pressure sensor measurement to a reference value as measured by a reference pressure sensor.

15. A method as claimed in claim 11, wherein the step of calibrating includes statistically analyzing the history of the fluid level sensor in order to calibrate the pressure sensor.

16. A method as claimed in claim 11, wherein the step of calibrating includes statistically analyzing the history of the pressure sensor in order to calibrate the fluid level sensor.

17. A method as claimed in either one of claims 15 or 16, wherein the statistical analysis includes determining a variance in measurements of the respective sensors to isolate the unexpected discrepancy.

18. A method as claimed in claim 11, wherein the step of calibrating includes activating a vibrator for removing undesired matter from the sensor arrangement.

* * * * *